(12) United States Patent
Chen et al.

(10) Patent No.: US 12,221,503 B2
(45) Date of Patent: Feb. 11, 2025

(54) QUATERNARY AMMONIUM GROUP-GRAFTED CATION RESIN AND PREPARATION METHOD THEREOF

(71) Applicant: ZHEJIANG UNIVERSITY, Hangzhou (CN)

(72) Inventors: Xueming Chen, Hangzhou (CN); Xuejiao Zhang, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 577 days.

(21) Appl. No.: 17/642,966

(22) PCT Filed: Mar. 1, 2021

(86) PCT No.: PCT/CN2021/078380
§ 371 (c)(1),
(2) Date: Mar. 15, 2022

(87) PCT Pub. No.: WO2021/238315
PCT Pub. Date: Dec. 2, 2021

(65) Prior Publication Data
US 2022/0332873 A1     Oct. 20, 2022

(30) Foreign Application Priority Data

May 25, 2020   (CN) .......................... 202010447925.6

(51) Int. Cl.
| | |
|---|---|
| C08F 8/30 | (2006.01) |
| B01J 39/20 | (2006.01) |
| B01J 49/30 | (2017.01) |
| C02F 1/469 | (2023.01) |
| C08F 8/32 | (2006.01) |
| C08F 8/34 | (2006.01) |
| C08F 8/36 | (2006.01) |
| C08F 257/02 | (2006.01) |
| C02F 101/20 | (2006.01) |

(52) U.S. Cl.
CPC ............. *C08F 257/02* (2013.01); *B01J 39/20* (2013.01); *B01J 49/30* (2017.01); *C02F 1/4695* (2013.01); *C02F 2101/20* (2013.01)

(58) Field of Classification Search
CPC ...... C08F 8/30; C08F 8/32; C08F 8/34; C08F 8/36
USPC .................................................. 525/344, 379
See application file for complete search history.

(56) References Cited

U.S. PATENT DOCUMENTS

| | | | |
|---|---|---|---|
| 5,078,913 A * | 1/1992 | Bennett ................... | C08F 8/44 |
| | | | 528/487 |
| 5,523,327 A | 6/1996 | Song et al. | |
| 2010/0130626 A1* | 5/2010 | Fukui ...................... | C02F 1/42 |
| | | | 521/29 |

FOREIGN PATENT DOCUMENTS

| | | |
|---|---|---|
| CN | 103249485 A | 8/2013 |
| CN | 109485766 A | 3/2019 |
| CN | 110300735 A | 10/2019 |
| CN | 111607024 A | 9/2020 |
| JP | 2003221414 A * | 8/2003 ............ C08F 8/36 |

OTHER PUBLICATIONS

Machine translation of JP-2003221414-A (No. date).*
Guangzhu Wang, et al., GB/T 8144-2008, Determination of exchange capacity of cation exchange resin, 2008, pp. 1-5.
Guangzhu Wang, et al., GB/T 11992-2008, Determination of exchange capacity of strong basic anion exchange resins in chloride form, 2008, pp. 1-5.

* cited by examiner

*Primary Examiner* — Michael J Feely
(74) *Attorney, Agent, or Firm* — Bayramoglu Law Offices LLC

(57) ABSTRACT

A quaternary ammonium group-grafted cation resin and a preparation method thereof are provided. The preparation method includes: adding a chloromethylated cross-linked polystyrene (PS) resin, trimethylamine hydrochloride, and a 20% sodium hydroxide aqueous solution successively to a reactor for a reaction under stirring at 30° C. to 40° C.; filtering a resulting reaction solution, followed by washing and drying to obtain a quaternary ammonium group-grafted resin; adding the quaternary ammonium group-grafted resin, 1,2-dichloroethane, silver sulfate, concentrated sulfuric acid, and fuming sulfuric acid successively for a reaction for 1 hour at 50° C. to 60° C., a reaction for 1 hour at 70° C. to 80° C., and a reaction for 5 hours at 115° C. to 125° C.; and cooling a resulting reaction solution to room temperature, followed by diluting, filtering, washing and drying to obtain the quaternary ammonium group-grafted cation resin.

6 Claims, 1 Drawing Sheet

QUATERNARY AMMONIUM GROUP-GRAFTED CATION RESIN AND PREPARATION METHOD THEREOF

CROSS REFERENCE TO THE RELATED APPLICATIONS

This application is the national phase entry of International Application No. PCT/CN2021/078380, filed on Mar. 1, 2021, which is based upon and claims priority to Chinese Patent Application No. 202010447925.6, filed on May 25, 2020, the entire contents of which are incorporated herein by reference.

TECHNICAL FIELD

The present disclosure relates to an ion-exchange resin and a preparation method thereof, and in particular to a quaternary ammonium group-grafted cation resin and a preparation method thereof.

BACKGROUND

Membrane-free electrodeionization (MFEDI) is a new deionization technology that uses an ion-exchange resin as a functional material and only consumes direct current (DC) power for regeneration, without the need of any chemical agents and ion-exchange membranes, which has outstanding advantages such as high purification efficiency, environmental friendliness, and reliable operation. An ion-exchange resin is the core of an MFEDI device, and characteristics of the resin have a significant impact on an operation effect of the MFEDI device.

Previous studies have shown that strong-acid and strong-base mixed resins have excellent electrical conductivity and deionization ability, but show poor electrical regeneration effects. Restricted by the performance of current common ion-exchange resins, the electrical regeneration efficiency of MFEDI still needs to be improved. Therefore, the improvement of electrical regeneration efficiency has become a core problem that must be solved in the future development of MFEDI technology.

SUMMARY

The present disclosure is intended to provide a quaternary ammonium group-grafted cation resin and a preparation method thereof, such as to overcome the problem of MFEDI in the background art that strong-acid and strong-base mixed resins have poor electrical regeneration effects.

In order to achieve the above objective, the present disclosure adopts the following technical solutions:

I. A quaternary ammonium group-grafted cation resin is provided, which is mainly prepared from the following raw materials in parts by weight:

chloromethylated cross-linked polystyrene (PS) resin at 10 to 20 parts, 1,2-dichloroethane at 40 to 80 parts, trimethylamine hydrochloride at 5 to 20 parts, 20% sodium hydroxide aqueous solution at 20 to 80 parts, 5% sodium hydroxide aqueous solution at 500 to 1,000 parts, 5% hydrochloric acid aqueous solution at 1,000 to 2,000 parts, silver sulfate at 0.5 to 1 part, concentrated sulfuric acid at 15 to 30 parts, fuming sulfuric acid at 15 to 30 parts, and deionized water at 9,000 to 18,000 parts.

The chloromethylated cross-linked PS resin may have a crosslinking degree of 7% and a chlorine content of 10%.

The fuming sulfuric acid may have a mass fraction of 60%.

II. A preparation method of the quaternary ammonium group-grafted cation resin is provided, including the following steps:

1) introduction of a quaternary ammonium group into the chloromethylated cross-linked PS resin;

1.1) adding the chloromethylated cross-linked PS resin and the trimethylamine hydrochloride successively to a reaction vessel;

1.2) adding the 20% sodium hydroxide aqueous solution dropwise to the reaction vessel within 1 hour, keeping a temperature at 30° C. to 40° C., and continuously stirring to allow a reaction for 2 hours;

1.3) after the reaction is completed, filtering a reaction solution to obtain a resin, and washing the resin with the 5% sodium hydroxide aqueous solution, the 5% hydrochloric acid aqueous solution, and the deionized water successively until an effluent has a pH of 7;

1.4) drying the resin at 60° C. to obtain a quaternary ammonium group-grafted chloromethylated cross-linked PS resin;

2) sulfonation of the quaternary ammonium group-grafted chloromethylated cross-linked PS resin;

2.1) adding the quaternary ammonium group-grafted chloromethylated cross-linked PS resin obtained in step 1.4), the 1,2-dichloroethane, the silver sulfate, the concentrated sulfuric acid, and the fuming sulfuric acid successively to a reaction vessel;

2.2) keeping a temperature at 50° C. to 60° C., and continuously stirring to allow a reaction for 1 hour;

2.3) raising the temperature to 70° C. to 80° C., and continuously stirring to allow a reaction for 1 hour;

2.4) raising the temperature to 115° C. to 125° C., and continuously stirring to allow a reaction for 5 hours;

2.5) after the reaction is completed, cooling a resulting reaction solution to room temperature, and diluting and filtering the reaction solution to obtain a resin; and washing the resin with deionized water, converting the resin with the 5% hydrochloric acid aqueous solution, and washing a converted resin with deionized water until an effluent has a pH of 7;

2.6) drying the converted resin at 60° C. to obtain the quaternary ammonium group-grafted cation resin.

The present disclosure has the following beneficial effects:

The electrical regeneration performance of the cation resin prepared by the present disclosure is improved by introducing the quaternary ammonium group. The cation resin can be used in MFEDI to solve the problem in the prior art that strong-acid and strong-base mixed resins have poor electrical regeneration effects. Specifically, the cation resin can be used for the preparation of high purity water in MFEDI and the treatment of heavy metal wastewater.

DETAILED DESCRIPTION OF THE EMBODIMENTS

Figure 1:
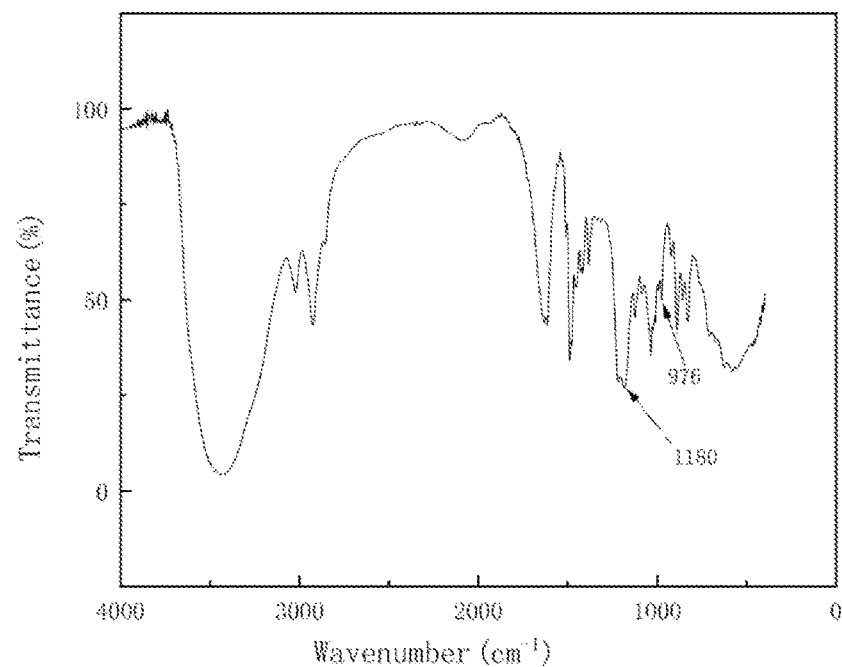
FIG. 1 is an infrared (IR) spectrum of the cation resin prepared in Example 3 of the present disclosure.

An exchange capacity of the following resin was determined according to GB/T8144-2008 "Determination Method of Exchange Capacity of Cation-Exchange Resin" and GB/T 11992-2008 "Determination Method of Exchange Capacity of Chlorine-type Strong-base Anion-exchange Resin".

Example 1

1) Introduction of a quaternary ammonium group into a chloromethylated cross-linked PS resin;

1.1) 15 parts of a chloromethylated cross-linked PS resin and 18 parts of trimethylamine hydrochloride were successively added to a reaction vessel.

1.2) 72 parts of a 20% sodium hydroxide aqueous solution were added dropwise to the reaction vessel within 1 hour, a temperature was kept at 30° C. to 40° C., and a resulting mixture was continuously stirred to allow a reaction for 2 hours.

1.3) After the reaction was completed, a reaction solution was filtered to obtain a resin, and the resin was washed with 750 parts of a 5% sodium hydroxide aqueous solution, converted with 750 parts of a 5% hydrochloric acid aqueous solution, and washed with 4,500 parts of deionized water until an effluent had a pH of 7.

1.4) The resin was dried at 60° C. to obtain a quaternary ammonium group-grafted chloromethylated cross-linked PS resin.

2) Sulfonation of the quaternary ammonium group-grafted chloromethylated cross-linked PS resin;

2.1) 15 parts of the resin obtained in step 1.4), 60 parts of 1,2-dichloroethane, 0.75 part of silver sulfate, 15 parts of concentrated sulfuric acid, and 15 parts of fuming sulfuric acid were added successively to a reaction vessel.

2.2) A temperature was kept at 50° C. to 60° C., and a resulting mixture was continuously stirred to allow a reaction for 1 hour.

2.3) The temperature was raised to 70° C. to 80° C., and the mixture was continuously stirred to allow a reaction for 1 hour.

2.4) The temperature was raised to 115° C. to 125° C., and the mixture was continuously stirred to allow a reaction for 5 hours.

2.5) After the reaction was completed, a resulting reaction solution was cooled to room temperature, diluted, and filtered to obtain a resin; and the resin was washed with 4,500 parts of deionized water, then converted with 750 parts of a 5% hydrochloric acid aqueous solution, and washed with 4,500 parts of deionized water until an effluent had a pH of 7.

2.6) The resin was dried at 60° C. to obtain the quaternary ammonium group-grafted cation resin.

The chloromethylated cross-linked PS resin had a cross-linking degree of 7% and a chlorine content of 10%.

The fuming sulfuric acid had a mass fraction of 600%.

The cation resin obtained above had an exchange capacity of 0.90 mol/L, and the quaternary ammonium group had an exchange capacity of 0.09 mol/L.

Example 2

1) Introduction of a quaternary ammonium group into a chloromethylated cross-linked PS resin;

1.1) 20 parts of a chloromethylated cross-linked PS resin and 20 parts of trimethylamine hydrochloride were successively added to a reaction vessel.

1.2) 80 parts of a 20% sodium hydroxide aqueous solution were added dropwise to the reaction vessel within 1 hour, a temperature was kept at 30° C. to 40° C., and a resulting mixture was continuously stirred to allow a reaction for 2 hours.

1.3) After the reaction was completed, a reaction solution was filtered to obtain a resin, and the resin was washed with 1000 parts of a 5% sodium hydroxide aqueous solution, converted with 1000 parts of a 5% hydrochloric acid aqueous solution, and washed with 6000 parts of deionized water until an effluent had a pH of 7.

1.4) The resin was dried at 60° C. to obtain a quaternary ammonium group-grafted chloromethylated cross-linked PS resin.

2) Sulfonation of the quaternary ammonium group-grafted chloromethylated cross-linked PS resin;

2.1) 20 parts of the resin obtained in step 1.4), 80 parts of 1,2-dichloroethane, 1 part of silver sulfate, 30 parts of concentrated sulfuric acid, and 30 parts of fuming sulfuric acid were added successively to a reaction vessel.

2.2) A temperature was kept at 50° C. to 60° C., and a resulting mixture was continuously stirred to allow a reaction for 1 hour.

2.3) The temperature was raised to 70° C. to 80° C., and the mixture was continuously stirred to allow a reaction for 1 hour.

2.4) The temperature was raised to 115° C. to 125° C., and the mixture was continuously stirred to allow a reaction for 5 hours.

2.5) After the reaction was completed, a resulting reaction solution was cooled to room temperature, diluted, and filtered to obtain a resin; and the resin was washed with 6,000 parts of deionized water, then converted with 1,000 parts of a 5% hydrochloric acid aqueous solution, and washed with 6,000 parts of deionized water until an effluent had a pH of 7.

2.6) The resin was dried at 60° C. to obtain the quaternary ammonium group-grafted cation resin.

The chloromethylated cross-linked PS resin had a cross-linking degree of 7% and a chlorine content of 10%.

The fuming sulfuric acid had a mass fraction of 60%.

The cation resin obtained above had an exchange capacity of 1.10 mol/L, and the quaternary ammonium group had an exchange capacity of 0.07 mol/L.

Example 3

1) Introduction of a quaternary ammonium group into a chloromethylated cross-linked PS resin;

1.1) 10 parts of a chloromethylated cross-linked PS resin and 5 parts of trimethylamine hydrochloride were successively added to a reaction vessel.

1.2) 20 parts of a 20% sodium hydroxide aqueous solution were added dropwise to the reaction vessel within 1 hour, a temperature was kept at 30° C. to 40° C., and a resulting mixture was continuously stirred to allow a reaction for 2 hours.

1.3) After the reaction was completed, a reaction solution was filtered to obtain a resin, and the resin was washed with 500 parts of a 5% sodium hydroxide aqueous solution, converted with 500 parts of a 5% hydrochloric acid aqueous solution, and washed with 3,000 parts of deionized water until an effluent had a pH of 7.

1.4) The resin was dried at 60° C. to obtain a quaternary ammonium group-grafted chloromethylated cross-linked PS resin.

2) Sulfonation of the quaternary ammonium group-grafted chloromethylated cross-linked PS resin;

2.1) 10 parts of the resin obtained in step 1.4), 40 parts of 1,2-dichloroethane, 0.5 part of silver sulfate, 20 parts of concentrated sulfuric acid, and 20 parts of fuming sulfuric acid were added successively to a reaction vessel.

2.2) A temperature was kept at 50° C. to 60° C., and a resulting mixture was continuously stirred to allow a reaction for 1 hour.

2.3) The temperature was raised to 70° C. to 80° C., and the mixture was continuously stirred to allow a reaction for 1 hour.

2.4) The temperature was raised to 115° C. to 125° C., and the mixture was continuously stirred to allow a reaction for 5 hours.

2.5) After the reaction was completed, a resulting reaction solution was cooled to room temperature, diluted, and filtered to obtain a resin; and the resin was washed with 3,000 parts of deionized water, then converted with 500 parts of a 5% hydrochloric acid aqueous solution, and washed with 3,000 parts of deionized water until an effluent had a pH of 7.

2.6) The resin was dried at 60° C. to obtain the quaternary ammonium group-grafted cation resin.

The chloromethylated cross-linked PS resin had a cross-linking degree of 7% and a chlorine content of 10%.

The fuming sulfuric acid had a mass fraction of 600%.

The cation resin obtained above had an exchange capacity of 1.35 mol/L, and the quaternary ammonium group had an exchange capacity of 0.05 mol/L.

A Nicolet 370 Fourier transform infrared (FTIR) spectrometer was used to conduct FTIR analysis on the cation resin prepared in the above example, and a spectrum thereof was shown in FIG. 1, wherein a characteristic peak at 1,180 $cm^{-1}$ indicated the successful grafting of the sulfonic acid group and a characteristic peak at 976 $cm^{-1}$ indicated the introduction of the quaternary ammonium group.

Figure 2:
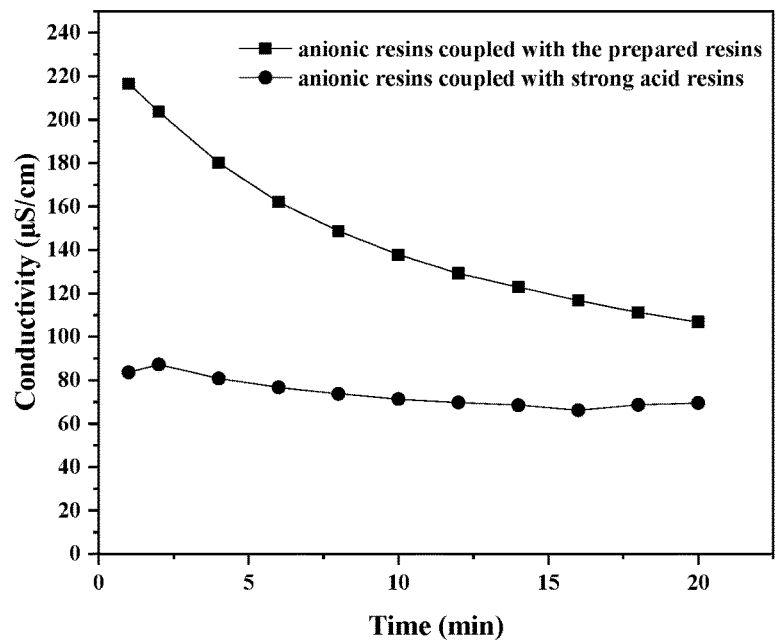
FIG. 2 shows the comparison of regeneration performance between the cation resin prepared in Example 3 of the present disclosure and a strong-acid resin.

The cation resin prepared in the above example was mixed with a strong-base resin and converted into a Na—Cl type, and then used in an MFEDI device, and the electrical regeneration performance was tested, with a strong-acid and strong-base mixed resin as a contrast. When the MFEDI device was filled with different resins, a conductivity change of a regeneration solution was shown in FIG. 2. A regeneration solution of a mixed resin of the cation resin prepared in the present disclosure and the strong-base resin had an average $Na^+$ concentration of 20.8 mg/L, while a regeneration solution of the strong-acid and strong-base mixed resin had an average $Na^+$ concentration only of 9.6 mg/L, indicating that, compared with the commercially available strong-acid resins, the prepared cation resin shows improved electrical regeneration performance due to the introduction of the quaternary ammonium group.

What is claimed is:

1. A preparation method of a quaternary ammonium group-grafted cation resin, comprising the following steps:
   1) introducing a quaternary ammonium group into a chloromethylated cross-linked polystyrene (PS) resin comprising:
      1.1) adding a chloromethylated cross-linked PS resin and trimethylamine hydrochloride successively to a reaction vessel;
      1.2) adding a 20% sodium hydroxide aqueous solution dropwise to the reaction vessel within 1 hour, keeping a first temperature at 30° C. to 40° C., and continuously stirring to allow a first reaction for 2 hours;
      1.3) after the first reaction is completed, filtering a first reaction solution to obtain a first intermediate resin, and washing the first intermediate resin with a 5% sodium hydroxide aqueous solution, a 5% hydrochloric acid aqueous solution, and deionized water successively until a first effluent has a pH of 7 to obtain a first washed resin; and
      1.4) drying the first washed resin at 60° C. to obtain a quaternary ammonium group-grafted chloromethylated cross-linked PS resin;
   and
   2) sulfonating the quaternary ammonium group-grafted chloromethylated cross-linked PS resin comprising:
      2.1) adding the quaternary ammonium group-grafted chloromethylated cross-linked PS resin obtained in step 1.4), 1,2-dichloroethane, silver sulfate, concentrated sulfuric acid, and fuming sulfuric acid successively to the reaction vessel;
      2.2) keeping a second temperature at 50° C. to 60° C., and continuously stirring to allow a second reaction for 1 hour;
      2.3) raising the second temperature to 70° C. to 80° C., and continuously stirring to allow the second reaction for 1 hour;
      2.4) raising the second temperature to 115° C. to 125° C., and continuously stirring to allow the second reaction for 5 hours;
      2.5) after the second reaction is completed, cooling a second reaction solution to room temperature, and diluting and filtering the second reaction solution to obtain a second intermediate resin; and washing the second intermediate resin with deionized water to obtain a second washed resin, converting the second washed resin with a 5% hydrochloric acid aqueous solution to obtain a converted resin, and washing the converted resin with deionized water until a second effluent has a pH of 7; and
      2.6) drying the converted resin at 60° C. to obtain the quaternary ammonium group-grafted cation resin;
   wherein the method features the following relative amounts of raw materials in parts by weight:
   10 to 20 parts of chloromethylated cross-linked PS resin,
   40 to 80 parts of 1,2-dichloroethane,
   5 to 20 parts of trimethylamine hydrochloride,
   20 to 80 parts of 20% sodium hydroxide aqueous solution,
   500 to 1,000 parts of 5% sodium hydroxide aqueous solution,
   1,000 to 2,000 parts total of 5% hydrochloric acid aqueous solution,
   0.5 to 1 part of silver sulfate,
   15 to 30 parts of concentrated sulfuric acid,
   15 to 30 parts of fuming sulfuric acid, and
   9,000 to 18,000 parts total of deionized water.

2. The preparation method according to claim 1, wherein the chloromethylated cross-linked PS resin has a crosslinking degree of 7% and a chlorine content of 10%.

3. A quaternary ammonium group-grafted cation resin prepared by the preparation method according to claim 2.

4. The preparation method according to claim 1, wherein the fuming sulfuric acid has a mass fraction of 60%.

5. A quaternary ammonium group-grafted cation resin prepared by the preparation method according to claim 4.

6. A quaternary ammonium group-grafted cation resin prepared by the preparation method according to claim 1.

* * * * *